Patented May 15, 1945

2,375,960

UNITED STATES PATENT OFFICE 2,375,960

ELECTRICAL INSULATION

William N. Stoops, South Charleston, and Charles E. Staff, Charleston, W. Va., and Harold F. Wakefield, Bloomfield, N. J., assignors to Carbide and Carbon Chemicals Corporation, a corporation of New York No Drawing. Application March 1, 1944, Serial No. 524,648

9 Claims. (Cl. 260—31)

This invention relates to an improved resinous coating, adapted to serve as an electrical insulation for metals. The invention is primarily directed to the production of a suitably adherent, chemically resistant and electrically insulating coating, or enamel, for thin copper wire of the type employed in winding the armatures of electric motors.

Diverse and exacting properties are needed in a coating material which is to be serviceable when applied as a baked enamel to wire and similar metallic articles. In addition to having high dielectric strength, if the coating is to serve as an electrical insulation, the material must possess good adhesion to metals, particularly copper, and it must possess adequate flexibility so that the enamel film will not crack or break when the coated wire or article is bent. Furthermore, the coating must be hard and resistant to abrasion and these qualities must be retained at temperatures of at least about 125° C. Likewise, at this temperature, the coating must remain chemically stable for a prolonged period. Finally, the coating must be resistant to the action of hydrocarbon liquids at temperatures of about 100° C. and to the penetration of chemicals and water.

One of the objects of this invention is to provide a coating material which fulfills the above specifications more satisfactorily than the materials known at present. Another object is to provide generally an improved protective coating for metals.

In the Stoops and Denison Patent No. 2,324,739, issued July 20, 1943, an enamel coating is described which consists of the reaction product of a polyalkylene glycol, having at least three alkylene glycol units, with a conjoint polymer of a vinyl compound, such as styrene, and an unsaturated $\alpha,\beta$-ethylenic dibasic acid, such as maleic anhydride. The enamel described in that patent, while having adequate resistance to water for conventional applications, is not recommended for use where prolonged exposure to water may be encountered. Accordingly, a further object of this invention is to provide an enamel having superior resistance to water.

According to this invention, a coating of high elasticity, flexibility and adherence is produced by converting a soluble polymeric resin containing unreacted carboxyl groups to an insoluble form by reaction with certain insolubilizing agents at a high temperature, preferably above 400° F. An essential feature of the present invention is the production of a suitable resin prior to, and apart from, the insolubilizing treatment. In the preparation of such a resin, a monomeric vinyl compound of the structure $R.CH:CH_2$, where R may be an organic radical having at least one benzene ring, a lower aliphatic acyloxy group, or a halogen atom, is conjointly polymerized, preferably at a moderately elevated temperature and under catalytic influence, with an unsaturated dicarboxyl compound of the structure,

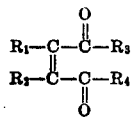

where either $R_1$ or $R_2$, or both, are hydrogen, a lower alkyl group, an aryl group, or an aralkyl group, and $R_3$ and $R_4$ are OH, or $R_3$ or $R_4$, taken together, are O, or $R_3$ is OH and $R_4$ is a lower alkoxy group. As catalysts there may be employed any material inducing polymerization, notably organic peroxides, such as dibenzoyl peroxide, acetyl benzoyl peroxide, or diacetyl peroxide.

Examples of monomeric vinyl compounds which are suitable for use in the above polymerization are styrene, vinyl naphthalene, isopropenyl benzene, vinyl acetate, vinyl propionate, vinyl butyrate, vinyl chloride, and vinyl bromide. Examples of unsaturated dicarboxyl compounds which are suitable to be conjointly polymerized with the monomeric vinyl compounds are maleic anhydride, maleic acid, methyl maleic acid, dimethyl maleic acid, ethyl maleic acid, phenyl maleic acid, dibenzyl maleic acid, mono-methyl maleate, mono-ethyl maleate and mono-butyl maleate.

There results from this polymerization a thermoplastic resin which has at least one reactive carboxyl group per mol of combined unsaturated dicarboxyl compound. The resin is soluble in aqueous alkaline solutions and in many organic solvents.

The preparation of the insolubilizing agent should be carried out apart from the production of the soluble polymeric resin containing carboxyl groups. The insolubilizing agent comprises an ester of a dibasic acid with a polyalkylene glycol, the ester containing two free hydroxyl groups. Such esters are prepared under conditions unfavorable to the formation of highly viscous, linear polyesters in which the hydroxyl groups are substantially esterified, for instance by conducting the esterification of the dibasic acid in the presence of about two mols of the polyalkylene glycol per mol of the dibasic acid. However, a moderate amount of linear polyester formation is not excluded provided that the resulting product contains a sufficient number of ester compounds with two free hydroxyl groups, and is non-viscous (i. e. freely flowing). Such products have no acid number (or a very low one) since they do not contain appreciable quantities of compounds containing terminal carboxyl groups, although the degree of condensation of the linear polyester included within the scope of the invention is below that at which viscous (i. e. slowly pourable) products are formed. For instance, a polyglycol ester, as produced above, contains no, or only very little condensation products containing from three to four dibasic acid radicals and from four to five polyglycol radicals respectively.

The insulating and protective coating of this invention may be prepared by applying to the metallic surface being coated a layer of the thermoplastic resin in which has been incorporated an insolubilizing agent of the type described above. Such a layer with its incorporated insolubilizing agent may conveniently be deposited on the metallic surface from a solution of the resin and the insolubilizing agent.

The metallic surface with the layer of resin and insolubilizing agent is then baked at an elevated temperature whereby the poly-alkylene glycol ester of the dibasic acid is caused to react chemically with the carboxyl groups of the resin. As a result of this heat treatment, it is believed that the polymeric resin chains become cross-linked by means of polyalkylene glycol ester linkages between carboxyl groups of different molecules. Cross-linkage between different carboxyl groups of the same resin molecule may also occur. By this means, the resin layer is converted to a hard and adherent coating which is insoluble and infusible, presumably by virtue of the cross-linking which occurs, and which is flexible and somewhat elastic, presumably by reason of the linear polymeric macromolecules to which the carboxyl groups are attached. Despite the insolubility and infusibility of the coating, it is not brittle, and this may be attributed to the internal plasticizing effect of the combined polyalkylene glycol ester of the dibasic acid. A coating produced in this manner does not decompose when exposed to temperatures of 100° C. for long periods; its resistance to chemicals and solvents is excellent, and, above all, it is characterized by its outstanding resistance to both hot and cold water.

Coatings producing according to the process of this invention are to be distinguished from those in which the ingredients are simultaneously reacted, for instance, from a resinous coating produced by the simultaneous condensation of styrene, maleic anhydride and ethylene glycol or glycerine. In this latter case the coatings produced are very brittle, not only because of the inherent differences between glycerine and ethylene glycol and the polyalkylene glycol esters of this invention, as further discussed below, but also because the formation of long chains of styrene and maleic anhydride is interrupted by the many other resin forming reactions which may occur.

The use of a dibasic acid ester of a polyalkylene glycol, the ester having two free hydroxyl groups, as the insolubilizing agent is essential to this invention. Comparative tests have established that dibasic acid esters of monoalkylene glycols, such as di(ethylene glycol) succinate or maleate, produce brittle enamels which have very poor resistance to water. Furthermore, insolubilizing agents which contain more than two hydroxyl groups, such as polyglycerine or polyvinyl alcohol, produce brittle enamels, possibly because they cause a too extensive cross-linkage of the resin containing the carboxyl groups, and because they exert an insufficient internal plasticizing effect. Examples of suitable polyalkylene glycols for forming the dibasic acid esters are the di-, tri-, and tetraethylene glycols; the corresponding polypropylene and polybutylene glycols; and polyalkylene polyglycols, such as symmetrical diethylene dipropylene glycol. The use of polyalkylene glycols ranging from dialkylene glycol to trialkylene glycol are preferred in forming the ester insolubilizing agents, since esters of polyalkylene glycols higher than the triglycol modification, tend to produce coatings which are somewhat soft. However, the esters of the higher polyalkylene glycols may be employed where this effect is not undesirable, and they may advantageously be included in mixture with the esters of the lower polyalkylene glycols, especially where a somewhat brittle resin of low molecular weight is to be insolubilized.

As mentioned previously, the insolubilizing agent consists of esters of dibasic acids with the foregoing polyalkylene glycols, the esters having two hydroxyl groups. In forming these esters, the dibasic acid is reacted with more than one mol of the polyalkylene glycol, and it is preferably reacted with two mols of the polyglycol. Such reaction mixtures may be used without purification, and they may contain a large proportion of the di(polyalkylene glycol) ester of the dibasic acid and some tri(polyalkylene glycol) diacid ester, as well as a small amount of higher linear polyesters, provided such polyesters contain two hydroxyl groups and are non-viscous, as previously defined. Small amounts of free polyalkylene glycol, if present, need not be removed, since in small concentrations they are not harmful. In fact, certain of the higher polyalkylene glycols, such as nonaethylene glycol, may be included in small proportions in the insolubilizing agent. It is also possible, depending on the proportions of dibasic acid and polyalkylene glycol employed, that a small amount of the acid ester having one or no free hydroxyl group might be formed, but it would not be essential to remove small amounts of such products.

In forming the ester insolubilizing agent, any dibasic carboxylic acid may be used, including those of the aliphatic, heterocyclic, aromatic or hydroaromatic series, and the cyclic acids referred to may be either mono or polycyclic. Of the aliphatic acids, malonic, succinic, maleic, malic, fumaric, citraconic, tartaric, glutaric, and adipic acids are most suitable, although the higher aliphatic dibasic acids may be employed. Suitable aromatic dibasic acids include phthalic acid, and isomeric phthalic acids, while examples of hydroaromatic dibasic acids are tetrahydrophthalic acid, methyl tetrahydrophthalic acid, phenyl tetrahydrophthalic acid, hexahydrophthalic acid, methyl hexahydrophthalic acid, endo-methylene tetrahydrophthalic acid, endo-methylene hexahydrophthalic acid, endo-ethylene tetrahydrophthalic acid, endo-ethylene hexahydrophthalic acid, and other adducts of conjugated hydrocarbons as described in United States Patent No. 1,944,731.

Esters of the lower aliphatic dibasic acids, such as maleic and succinic acids, are preferred where the resin and insolubilizing agent are to be applied from aqueous alkaline solutions, since these esters are water-soluble. However, organic solvents may be used for the resin, such as ethylene glycol monoethyl ether acetate, diethylene glycol monoethyl ether acetate, furfural, ethylene glycol diacetate, acetonyl acetone, methyl isobutyl ketone, isophorone, mesityl oxide, and mixtures of xylene and ethylene glycol monoethyl ether. In such case, any of the dibasic acids may be used, and insolubilizing agents derived from diethylene glycol diesters of phthalic acid and endo-methylene tetrahydrophthalate have yielded coatings of excellent water resistance.

Of the class of polyalkylene glycol diesters of lower aliphatic dibasic acids, esters of α,β-ethylenic acids, and particularly esters of maleic acid, are preferred, because, upon heat conversion of the thermoplastic resin containing carboxyl groups, coatings having superior resistance to water and alcohol, and being tougher and more resistant to abrasion are obtained. These effects may be attributed to the reaction of oxygen with the resinous poducts at the baking temperature, rather than to polymerization of the vinyl type. Despite the preference for these esters of maleic acid, the invention is not to be confused with those resins which are produced by the copolymerization of viscous glycol maleate polyesters with vinyl compounds. Resins thus produced are said to be valuable as molding compositions, but the resins produced according to this invention are of entirely different properties, and are not, in general, suited as molding compositions. The elastic and flexible properties of the coating of this invention may be ascribed, in part, to the presence of the highly polymerized resin employed as one of the reactants in forming the coating, and such resinous groups are not formed by the copolymerization of viscous glycol maleate polyesters with vinyl compounds.

It has been found that a resin formed by the conjoint polymerization of styrene with maleic anhydride is most suitable to employ as the thermoplastic resin to be reacted with a polyalkylene glycol dibasic acid ester to form the enamel coating. The conjoint polymer formed by this polymerization was generally observed to contain about 50% by weight of combined maleic anhydride.

Our experiments have also shown this thermoplastic resin desirably should be of such average molecular weight that the viscosity of a 12% solution of the resin in mesityl oxide is between about 14 and about 25 seconds measured at 20° C. in a Ford cup viscosimeter with a No. 4 tip. Resins of appreciably lower molecular weight or viscosity give rise to somewhat brittle enamels whereas resins of higher degree of polymerization do not result in any very significant improvement in flexibility or film strength when the thermoplastic resin is reacted with the polyalkylene glycol ester of the dibasic acid.

The hardness and abrasion resistance of the film formed by the reaction of the polymeric resin and insolubilizing agent, as well as its resistance to water and solvents, can be further improved by the addition to the liquid coating composition of small amounts of thermosetting or heat-hardenable resins while in the incompletely reacted state. These resins include phenol-formaldehyde resins, urea-formaldehyde resins, melamine-formaldehyde resins and alkyd resins. Of the latter type, a resin produced by the reaction of triethanolamine with maleic anhydride is particularly effective. These modifying resins are converted to the insoluble and infusible modifications during the heat treatment of the thermoplastic resin with the insolubilizing agent.

Of the examples to follow, the first will illustrate the preparation of the soluble thermoplastic resin and those succeeding, will exemplify its conversion to the protective and electrically insulating coating of this invention.

*Example 1*

One part of styrene, one part of maleic anhydride and 0.02 part of dibenzoyl peroxide were added to three parts of acetone and the solution thus formed was heated with stirring at 65° C. for six hours. The reactants interpolymerized and the conjoint polymer formed was recovered from the resulting viscous solution by precipitation with methanol and it was found to contain approximately 50% maleic anhydride by weight. The yield of the conjoint polymer was 80%. The resin was insoluble in alcohol but soluble in ketones and in alkaline solutions. For instance, the resin may be readily dissolved in dilute or concentrated solutions of ammonia or of sodium hydroxide.

*Example 2*

A varnish of the following composition was prepared:

| | Parts |
|---|---|
| Styrene-maleic anhydride resin | 2 |
| Di(diethylene glycol) maleate | 2 |
| Concentrated aqueous ammonia | 1 |
| Distilled water | 15 |
| Ethyl alcohol | 5 |

Di(diethylene glycol) maleate may be made by heating 1.0 mol of maleic anhydride with 2.05 mols of diethylene glycol at a temperature of 180° C. to 240° C. in a flash equipped with an agitator and a condenser for collecting the water formed, until the acid number is reduced to 3.0. The product is a light-colored, free-flowing liquid consisting principally of di(diethylene glycol) maleate having the structural formula:

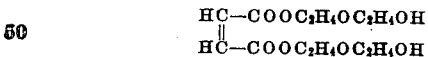

Six coats of the above enamel were applied to a No. 16 bare copper wire in an enameling machine. This was done by drawing the wire through the varnish bath at a speed of 15 feet per minute, and then through a baking tower about 13 feet long maintained at a temperature of 815° F. The high temperatures are employed to facilitate the drying of the coating, and the subsequent chemical reaction of the resin and the glycol ester.

Tests on the coated wire showed that it had a scrape test value of 46 ounces as compared to a value of 26 ounces for the conventional enamel composed of a combination of natural oils and resins. The scrape test measures the hardness and resistance to abrasion of the coating. It is conducted by applying a weighted rod, 0.016 inch in diameter, at right angles to the coated surface of the wire, drawing the wire at a temperature of 220° F. past the rod at a constant speed, and measuring the force required to scrape off the coating and to cause the rod to contact the metal. The point of contact is indicated by completion of an electrical circuit, having a warning device.

The Scott twist value of the coated wire was 106, as compared to a value of 75 for conventional enamel. This test is carried out by clamping a specimen of the coated wire, 10 inches in length, between a fixed head and a rotatable head; and measuring the number of twists which can be given the wire before the coating cracks or peels.

The coating on the wire was tough and not brittle, as shown by its passing the shock test satisfactorily. This test is performed by clamping one end of the wire in a vise, and manually subjecting the wire to a sudden jerk, which breaks the wire. The fractured end of the wire is examined for cracking or peeling of the coating at the points adjacent to the fracture. If none is apparent, the coated wire is considered to have passed the first part of the test. After shock, a portion of the wire near the fractured end is wound around its own diameter as a mandrel. If no cracks are apparent in the coating, it is considered to have passed the second part of the test.

The coating had excellent resistance to both hot and cold water. The resistance to hot water is determined by immersing a coil of the coated wire in boiling water for ten minutes. The resistance of the coated wire to cold water is determined by immersion of the coated wire for from one to two weeks. After the test, the coating is examined for evidence of softening or blistering, or both softening and blistering.

When the above example was repeated using di(ethylene glycol) maleate in place of di(diethylene glycol) maleate, brittle enamel was obtained in all instances, using a coating speed of 15 feet per minute, at various temperatures both above and below 815° F. The coating thus produced did not adhere on shock, and would readily crack and peel.

*Example 3*

A varnish of the following composition was prepared:

|  | Parts |
|---|---|
| Styrene-maleic anhydride resin | 2 |
| Di(triethylene glycol) maleate | 2 |
| Concentrated aqueous ammonia | 1 |
| Distilled water | 15 |
| Ethyl alcohol | 5 |

Six coats of this enamel were applied to a No. 16 copper wire at a temperature of 845° F., and at a coating speed of 15 feet per minute. The coated wire was of good appearance and was resistant to hot and cold water, although it softened slightly in the test. The coating was tough and adherent as shown by the facts that it passed the shock test satisfactorily, that its scrape test value was 32 ounces and its Scott twist value was 117.

Di(triethylene glycol) maleate may be made by heating 1.0 mol of maleic anhydride with 2.05 mols of triethylene glycol at a temperature of 180° C. to 240° C. in a flask equipped with a stirrer and a condenser for collecting the water formed until the acid number is reduced to 5.5. The product was a light-colored free-flowing liquid having a molecular weight of 368 by boiling point elevation indicating that it was principally di(triethylene glycol) maleate having the structural formula:

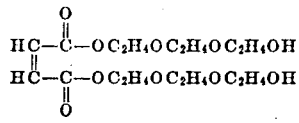

Other preparations of di(triethylene glycol) maleate having yielded products having acid numbers from 2.4 to 6.0 and hydroxyl values from 5.8 to 10. The low acid values of the products indicate that they contain only small amounts of acid esters of low molecular weight, and do not mean that the products are viscous, linear polyesters of high molecular weight. The reaction times were usually about 24 hours.

*Example 4*

A varnish containing an alkyd resin was prepared in the following proportions:

|  | Parts |
|---|---|
| Styrene-maleic anhydride resin | 2 |
| Di(triethylene glycol) maleate | 2 |
| Triethanolamine-maleic anhydride resin | 0.3 |
| Concentrated aqueous ammonia | 1 |
| Distilled water | 15 |
| Ethyl alcohol | 5 |

The triethanolamine-maleic anhydride resin contained 20% water, and was prepared by reacting equal parts by weight of the materials.

Six coats of this varnish were applied to a No. 16 copper wire and each coat was baked at a temperature of 865° F. The triethanolamine-maleic anhydride resin was converted to the insoluble and infusible form during the baking operation and considerably improved the properties of the coating. Thus the scrape test value of the coating was 58, and the coating did not soften or blister on exposure to hot and cold water. Moreover, the coating showed superior resistance to a boiling mixture of equal parts of alcohol and toluene than did the coating of Example 3, although that coating was satisfactorily resistant. The Scott twist value of the modified coating was 85.

*Example 5*

A varnish containing a phenolic resin was prepared as follows:

|  | Parts |
|---|---|
| Styrene-maleic anhydride resin | 2 |
| Di(triethylene glycol) maleate | 2 |
| Water-soluble phenol formaldehyde resin | 0.2 |
| Concentrated aqueous ammonia | 1 |
| Distilled water | 15 |
| Ethyl alcohol | 5 |

The water-soluble phenol-formaldehyde resin was prepared according to United States Patent No. 2,034,457 to H. L. Bender.

Six coats of this composition were applied to a No. 16 copper wire and the coatings were baked at a temperature of 650° F. The coating speed employed was 9.1 feet per minute, and the length of the baking tower was 7 feet. The coating after baking was very resistant to both hot and cold water, and it had a scrape test value of 54. The Scott twist value was 96.

*Example 6*

A varnish of the following composition was prepared:

|  | Parts |
|---|---|
| Styrene-maleic anhydride resin | 2 |
| Di(triethylene glycol) succinate | 2 |
| Concentrated aqueous ammonia | 1 |
| Distilled water | 15 |
| Ethyl alcohol | 5 |

Six coats of this enamel were applied to a No. 16 copper wire at a coating speed of 15 feet per minute, and each coating baked at a temperature of 800° F. The coating was hard and adherent and passed the shock test satisfactorily. It had excellent resistance to both hot and cold water.

Di(triethylene glycol) succinate was made by heating 1.0 mol of succinic acid with 2.05 mols of triethylene glycol at 190° C. to 240° C. until the acid number was reduced to 9.5. The product was a light-colored liquid and consisted principally of di(triethylene glycol) succinate, having the formula:

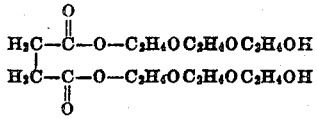

Example 7

A varnish of the following composition was prepared:

| | Parts |
|---|---|
| Styrene-maleic anhydride resin | 2 |
| Di(tetraethylene glycol) endomethylene hexahydrophthalate | 3 |
| Concentrated aqueous ammonia | 1 |
| Distilled water | 15 |
| Ethyl alcohol | 5 |

This varnish was applied to wire in the manner described in the foregoing examples. A flexible enamel was obtained but it was somewhat softer than the enamels described in the previous examples.

Di(tetraethylene glycol) endomethylene hexahydrophthalate may be made by heating 1.0 mol of endomethylene hexahydrophthalic anhydride with 2.2 mols of tetraethylene glycol in the presence of a catalytic amount of p-toluene sulfuric acid until the acid number is reduced to 8 or lower. This compound has the structural formula:

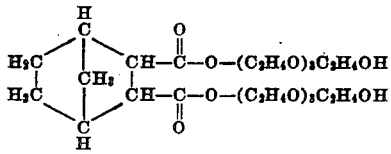

Modifications of the invention other than as shown in the foregoing examples will be apparent to those skilled in the art and are included within the scope of the invention. For instance, solvents other than those specifically shown may be employed, and other modifying thermosetting resins may be included in the coating, as well as drying oils, natural resins, plasticizers, filling materials, and the like.

This application is a continuation-in-part of our copending application Serial No. 428,498, filed January 28, 1942.

We claim:

1. A metal article having a flexible, water-insoluble and infusible coating comprising the thermal reaction product of a copolymer of one of the group consisting of styrene, vinyl chloride and vinyl acetate and one of the group consisting of maleic acid, maleic anhydride and lower mono-alkyl esters of maleic acid with a dihydric compound of the structure:

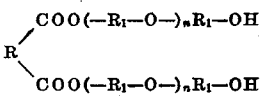

where R is the hydrocarbon radical of a dicarboxylic acid, $n$ is an integer from 1 to 3, and $R_1$ is of the group consisting of ethylene and 1,2-propylene radicals.

2. A wire enamel adapted to form a flexible, water-insoluble, infusible and electrically insulating coating on copper wire when baked thereon, comprising a solution in aqueous ammonia of a copolymer of styrene with maleic anhydride and a dihydric compound of the structure:

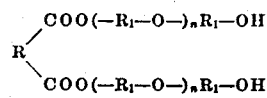

where R is the hydrocarbon radical of a dicarboxylic acid, $n$ is an integer from 1 to 3, and $R_1$ is of the group consisting of ethylene and 1,2-propylene radicals.

3. A metal article having a flexible, water-insoluble and infusible coating comprising the reaction product at a temperature above 400° F. of a copolymer of styrene with maleic anhydride with a dihydric compound of the structure:

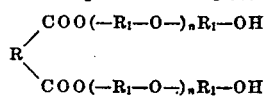

where R is the hydrocarbon radical of a dicarboxylic acid, $n$ is an integer from 1 to 3, and $R_1$ is of the group consisting of ethylene and 1,2-propylene radicals.

4. A copper wire having a flexible, water-insoluble and infusible coating comprising the product of reaction at a temperature above 400° F. of di(diethylene glycol) maleate with a conjoint polymer of styrene with maleic anhydride which is soluble in alkaline solutions.

5. A copper wire having a flexible, water-insoluble and infusible coating comprising the product of reaction at a temperature above 400° F. of di(triethylene glycol) maleate with a conjoint polymer of styrene with maleic anhydride which is soluble in alkaline solutions.

6. Process for coating wire which comprises applying to the wire a fluid solution containing a copolymer of one of the group consisting of styrene, vinyl chloride and vinyl acetate with one of the group consisting of maleic acid, maleic anhydride and lower mono-alkyl esters of maleic acid, and a dihydric compound of the structure:

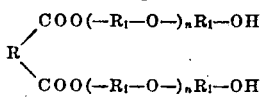

where R is the hydrocarbon radical of a dicarboxylic acid, $n$ is an integer from 1 to 3, and $R_1$ is of the group consisting of ethylene and 1,2-propylene radicals, and thereafter heating the wire and applied solution at a temperature above 400° F., and forming a flexible, water-insoluble and infusible coating on said wire.

7. A metal article having a flexible water-insoluble and infusible coating comprising a major portion of one resin and a minor portion of a second modifying resin, said first resin being the thermal reaction product of a copolymer of one of the group consisting of styrene, vinyl chloride and vinyl acetate and one of the group consisting of maleic acid, maleic anhydride and lower mono-alkyl esters of maleic acid with a dihydric compound of the structure:

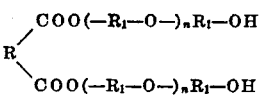

where R is the hydrocarbon radical of a dicarboxylic acid, $n$ is an integer from 1 to 3, and $R_1$ is of the group consisting of ethylene and 1,2-propylene radicals, and said second modifying resin being a thermosetting resin heat-converted to the insoluble and infusible state.

8. A copper wire having a flexible, water-insoluble and infusible coating comprising a major portion of the thermal reaction product of di-(triethylene glycol) maleate with a conjoint polymer of styrene and maleic anhydride which is soluble in alkaline solutions, and a minor proportion of an infusible resin resulting from the reaction of triethanolamine with maleic anhydride.

9. A copper wire having a flexible, water-insoluble and infusible coating comprising a major portion of the thermal reaction product of di-(triethylene glycol) maleate with a conjoint polymer of styrene and maleic anhydride which is soluble in alkaline solutions, and a minor proportion of an infusible resin resulting from the reaction of phenol with formaldehyde.

WILLIAM N. STOOPS.
CHARLES E. STAFF.
HAROLD F. WAKEFIELD.